UNITED STATES PATENT OFFICE.

PHILIP B. HUNT, OF MINNEAPOLIS, MINNESOTA.

PHOSPHATE BAKING-POWDER.

SPECIFICATION forming part of Letters Patent No. 654,571, dated July 24, 1900.

Application filed June 21, 1900. Serial No. 21,122. (No specimens.)

*To all whom it may concern:*

Be it known that I, PHILIP B. HUNT, of the city of Minneapolis, county of Hennepin, State of Minnesota, have invented certain new and useful Improvements in Phosphatic Baking-Powders, of which the following is a specification.

This invention relates to a baking preparation containing a phosphoric acid material in a comparatively coarsely subdivided condition, reasonably uniform in the size of its particles, and containing the pulverulent material of the process of pulverization.

As is well known to those familiar with the art, phosphoric-acid materials have almost universally and invariably been employed in baking preparations in a finely-pulverulent form. This method is open to two chief objections—viz., the extremely hygroscopic nature of the fine phosphatic material and the too-ready solubility of the same in water, which has resulted in the rapid deterioration of the powder, on the one hand, and in the loss of an undue proportion of the leavening-gas before incorporation with the materials of the loaf on the other. To a limited extent such powders have also been prepared with a phosphoric-acid material in a granular condition essentially free from pulverulent phosphatic material, the granular phosphate being obtained as a result of elaborate and expensive processes of grinding and bolting in such a manner as to secure particles of a practically-uniform size essentially freed from all pulverulent material. The advantages claimed for this latter method of preparing the phosphatic material are that when thus prepared the hygroscopic property is to a great extent gotten rid of and a slower evolution of gas is secured. The disadvantages of preparing the phosphatic-acid material in this manner are that in consequence of the entire phosphoric-acid material being present in a comparatively-coarse condition, no pulverulent material being present, the evolution of the leavening-gas is disadvantageously slow, resulting in a probability of imperfect decomposition of the constituents of the baking preparation and the liability of leaving more or less of these in the loaf in their undecomposed state, resulting in the impairment of its quality. Another disadvantage is the very great cost of the production of the phosphoric-acid material in this so-called "granular" form. The material which I propose to employ in a baking preparation differs essentially in its character from any heretofore proposed for such use and possesses distinct and evident advantages over any previously employed. It consists of phosphoric-acid material produced by a single crushing or grinding operation upon the crude commercial phosphate. The phosphatic material when discharged from the grinding-machine is mostly coarse in grain, all passing a fifty-mesh screen, but contains a considerable proportion of fine material that is thoroughly admixed with the coarser particles. The bulk of the product of the pulverizing or grinding machine will pass through a screen having a hundred meshes to the square inch. About twenty-five per cent. refuses to pass so fine a screen, but will freely pass through a fifty-mesh screen. Of the remainder quite twenty-five per cent. is so fine as to freely pass a screen of one hundred and twenty to one hundred and fifty mesh. Thus from one crushing operation I obtain a phosphatic powder the average fineness of which is approximately one hundred mesh, as measured by screen dimensions. This constitutes a separate and distinct product differing essentially in its character and deportment from any heretofore proposed for use in a baking preparation and possessing marked and valuable advantages over any of the other forms for such use.

What I claim as my invention consists in a baking preparation containing a form of phosphoric-acid material in a comparatively-coarse and reasonably-uniform state of subdivision, but still retaining a proportion of finely-divided phosphatic material from the original crushing process. This constitutes, when prepared in this manner, an ideal acidifying agent for a baking preparation and presents when suitably combined with an alkaline carbonate or bicarbonate and the proper amount of a suitable form of diluent, such as starch, essential advantages over any preparation heretofore proposed or employed. Experiment has demonstrated that baking preparations prepared in this manner are in consequence of the smallness of the proportion of the pulverulent phosphatic material not subject to any material degree of deterioration on prolonged exposure to atmospheric influences, and yet that the evolution of the leavening-gas takes place under the conditions in which such preparation would naturally be employed at the desired rate of speed and in the manner such as to secure under the existing conditions a complete decomposition of all the constituents and a consequently greater leavening power than could otherwise be attained, also that such baking preparation can be thus produced at a minimum of cost.

Having thus described my invention, I claim as new and desire to secure by Letters Patent—

1. A baking preparation containing phosphoric-acid material in the condition of its reduction to granular form from the form of commercial phosphate, and containing the fine phosphatic material produced in the process of reduction, substantially as described.

2. A baking preparation composed of phosphoric-acid material in coarse or granular condition containing the fine phosphatic material of original reduction in admixture with a carbonate or bicarbonate, substantially as described.

3. A baking preparation containing phosphoric-acid material, of three or more grades of pulverization in substantially the proportions described, substantially as described.

4. A baking preparation containing phosphoric-acid material, a suitable proportion thereof being finely pulverulent and a larger proportion thereof being in the condition of coarse particles or granules, substantially as described.

In testimony whereof I have hereunto set my hand, this 12th day of June, 1900, at Minneapolis, Minnesota.

PHILIP B. HUNT.

In presence of—
C. G. HAWLEY,
M. E. GOOLEY.